(12) United States Patent
Keil et al.

(10) Patent No.: US 10,317,308 B2
(45) Date of Patent: *Jun. 11, 2019

(54) TEST DISC SYSTEM

(71) Applicant: Michael Keil, Mücke-Merlau (DE)

(72) Inventors: Michael Keil, Mücke-Merlau (DE); Christopher Keil, Mücke-Merlau (DE)

(73) Assignee: Michael Keil, Mücke-Merlau (DE)

( * ) Notice: Subject to any disclaimer, the term of this patent is extended or adjusted under 35 U.S.C. 154(b) by 128 days.

This patent is subject to a terminal disclaimer.

(21) Appl. No.: 15/515,239

(22) PCT Filed: Aug. 27, 2015

(86) PCT No.: PCT/EP2015/069690
§ 371 (c)(1),
(2) Date: Mar. 29, 2017

(87) PCT Pub. No.: WO2016/050428
PCT Pub. Date: Apr. 7, 2016

(65) Prior Publication Data
US 2017/0219457 A1   Aug. 3, 2017

(30) Foreign Application Priority Data
Sep. 29, 2014 (DE) .......... 10 2014 114 147

(51) Int. Cl.
*G01M 3/32* (2006.01)
(52) U.S. Cl.
CPC ............ *G01M 3/3209* (2013.01); *G01M 3/32* (2013.01)
(58) Field of Classification Search
CPC ...... G01M 3/3209; G01M 3/027; G01M 3/32; B25J 21/02
See application file for complete search history.

(56) References Cited

U.S. PATENT DOCUMENTS 4,059,991 A * 11/1977 Dybel ................. B30B 15/0094
73/764
9,589,689 B2 * 3/2017 Fournier .................. B25J 21/02
(Continued)

FOREIGN PATENT DOCUMENTS

DE     101 45 597 A1    4/2003
EP       2 741 067 A1    6/2014
WO     2016/050428 A    4/2016

OTHER PUBLICATIONS

English Machine Translation of Keil—DE 10145597, Apr. 3, 2003, Translated online Sep. 2018 (Year: 2003).*

(Continued)

*Primary Examiner* — David Z Huang
(74) *Attorney, Agent, or Firm* — SoCal IP Law Group LLP; Guy Cumberbatch

(57) ABSTRACT

The invention relates to a test disc system having at least one test disc for testing the seal of a glove which is installed in a port of an insulator. The test disc (1) can be connected in a hermetically sealed fashion to the port, wherein the glove encloses with the test disc (1) a glove volume which can be placed under overpressure by the test disc (1). The test disc (1) has a base body in which electronic components for recording and storing a pressure profile in the glove volume, and at least one data interface are arranged. The test disc (1) also has a reading device for reading both a first identification element which is arranged on the glove and a second identification element which is assigned to the port.

13 Claims, 4 Drawing Sheets

(56) References Cited

U.S. PATENT DOCUMENTS

| | | | |
|---|---|---|---|
| 2010/0089635 A1* | 4/2010 | Hoeland | G01D 11/24 |
| | | | 174/520 |
| 2015/0141790 A1* | 5/2015 | Hannemann | A61B 5/04082 |
| | | | 600/387 |
| 2018/0231433 A1* | 8/2018 | Keil | B25J 21/02 |

OTHER PUBLICATIONS

"WirelessGT—The innovative glove leak testing system", Sep. 17, 2012, XP055175441, Retrieved from the Internet: URL: http://www.swisscleanroomconcept.ch/UserFiles/File/Firmen/Skan/wirelessgt_brochure_en_20140113_web.pdf. The whole document.

European Patent Office, International Search Report and Written Opinion for Application No. PCT/EP2015/069690, dated Dec. 3, 2015.

\* cited by examiner

TEST DISC SYSTEM

RELATED APPLICATION INFORMATION

This application is a national stage application under 35 U.S.C. § 371 of PCT/EP2015/069690, filed Aug. 27, 2015, which claims priority to DE 10 2014 114 147.4, filed Sep. 29, 2014, both entitled Test disc system, and the disclosures of which are hereby incorporated by reference in their entirety.

BACKGROUND

Field

The invention relates to a test disk system having at least one test disk for testing the condition of a seal of a glove which is installed in a port of an isolator.

A test disk system of this type is used for checking the condition of gloves which are installed in ports of isolators.

Description of the Related Art

Isolators are needed in various industrial sectors, for example in chemistry, pharmacy, nuclear technology but also in medicine, in order to produce a volume which is separate from the surroundings, in which selected substances can be kept and manipulated, for example subjected to chemical reactions, the transport of substances in (at least) one direction (from the isolator to the surroundings or from the surroundings to the isolator) being prevented.

Preventing the transport of substances from the isolator into the surroundings is necessary, for example, when radioactive substances or powdery chemicals are kept and handled in the isolator. Isolators in the nuclear sector (glove boxes) are operated with a high negative pressure in order to avoid the escape of radioactive substances into the surroundings under all circumstances. On the other hand, in the case of chemicals, a lower negative pressure relative to atmospheric pressure is sufficient.

Transport of substances from the surroundings into the isolator, on the other hand, must be prevented in particular in the case of isolators for aseptic pharmaceutical processes, in order to avoid contamination of the isolator volume or interior with germs from the surroundings. For this purpose, even a relatively low positive pressure relative to atmospheric pressure is sufficient.

In both cases, the handling of the substances in the isolator is preferably carried out with the aid of remotely controlled mechanical manipulators. However, there are many processes in which such automation is not possible or possible only with unacceptably high costs, so it is not possible to dispense with humans as operators. The access of the operator to the interior of the isolator is carried out via apertures in the wall of the isolator, so-called ports, which are equipped with flexible, hermetically tightly clamped-in gloves made of a sufficiently resistive material. The gloves are able firstly to ensure the seal (integrity) of the isolator volume but also to give the operator the necessary freedom of movement in order to carry out the necessary manipulations in the interior.

Any fault with the integrity of the isolator is subject to economic or even health risks. If, for example, germs from the surroundings penetrate into the isolator, then an entire batch of aseptically produced pharmaceutical products can become unusable. If, in the converse case, toxic substances escape from the isolator, then they can endanger the operator and the surroundings. Therefore, such faults must be prevented without fail and, if they nevertheless occur despite all countermeasures, must be detected and eliminated immediately.

By means of test disks which are inserted into the ports of an isolator, it is now possible to check the intactness or seal of the gloves installed on the port. A suitable test disk system is known, for example from EP 2 741 067 from the applicant. Here, a test disk matched to the shape of a port is inserted into the port in order to pressurize a volume of the glove connected to the port. Monitoring of the pressure profile then follows, a pressure loss leading to the glove being scrapped if it exceeds a certain limiting value. In order to be able to demonstrate which port with which glove the test disk is currently testing, the test disk is provided with a reading device which reads identification elements of the glove and of the port and assigns the same to the pressure data determined. The respective test disks can always be inserted only into ports of one size. In the case of installations having different port sizes, this solution is therefore relatively complicated. Furthermore, a power supply of the components of the test disks which, for example, is achieved via externally connectable accumulators, requires additional interfaces that are susceptible to contamination. In addition, the test disks become relatively cumbersome as a result.

SUMMARY OF THE INVENTION

The invention is, then, based on the object of overcoming the disadvantages of the prior art and in particular of specifying a test disk system which can be used variably. In particular, a use with different ports is to be possible with little outlay. The solution should be producible as economically as possible.

In a test disk system having at least one test disk for testing the seal of a glove which is installed in a port of an isolator, the invention provides for the test disk to be connectable in a hermetically sealed fashion to the port, wherein the glove encloses with the test disk a glove volume which can be placed under positive pressure by the test disk, wherein the test disk has a base body in which electronic components for recording and storing a pressure profile in the glove volume and at least one data interface are arranged, wherein the test disk has a reading device for reading both a first identification element which is arranged on the glove and also a second identification element which is assigned to the port.

In the test disk system according to the invention, accurate assignment of test disk, port and glove to one another is therefore ascertainable. As a result, it is possible to use historic data for comparison with current data, irrespective of whether, for example, the glove has been connected to another port in the meantime or another test disk is used. Each test disk is able to pressurize the glove volume and to detect the pressure profile self-sufficiently. Thus, without difficulty, as many test disks as desired can be used simultaneously and therefore many gloves can be checked simultaneously, which results in great time savings.

In a particularly preferred refinement, an accumulator is arranged in the base body as an electrical power store, which is connected to an inductive charging device. As a result, the accumulator can be accommodated in a fluid-tight manner within the base body, without charging connections that are susceptible to contamination being required. Thus, a smooth, easy to clean surface is obtained. Furthermore, charging is very simple, by the base body simply being placed on an appropriate charging facility. No connection to a charging plug is necessary. For example, charging can be carried out at the usual storage location of the test disk.

In a special refinement, the accumulator is arranged in a compartment which can be closed in an in particular fluid-tight manner via a cover which is arranged on a rear side of the base body. By opening the cover, the accumulator can then be replaced quickly if necessary. Thus, a discharged or defective accumulator can be replaced simply without having to open the base body, which is otherwise sealed off against external influences.

In an alternative refinement, the accumulator is accommodated within the base body, which is designed to be closed in a fluid-tight manner. The accumulator is therefore, for example, protected reliably against theft or other loss. In addition, no additional opening in the base body is then required, so that the latter can be produced tightly with little outlay and has a surface that is easier to clean. The penetration of contaminants into the area of the accumulator is not possible in this refinement.

The test disk system preferably comprises an inductive charging station, in which the test disk can be deposited, wherein the accumulator of the test disk can be charged inductively. The charging station can then effect secure accommodation of the test disk by means of an appropriate shaping. If necessary, the charging station can also be equipped in such a way that it is able to accommodate and charge multiple test disks simultaneously. The charging station can thus serve as a continuous storage location for test disks currently not used. It is also possible to install the charging station on a handcart, so that the test disks can be moved to the desired location of use in a collected manner. Charging is then carried out either via an energy store installed in the handcart or by connecting the handcart and/or the charging station to a power connection.

The test disk preferably has a radially expandable sealing device. If the test disk is inserted into a port, the sealing device is formed in such a way that it expands radially outward and thus rests in a fluid-tight manner on an inner wall of the port. If the test disk overlaps a port, so that the sealing device rests on the outside of the port, it is configured in such a way that it expands radially inward and accordingly rests in a fluid-tight manner on the port from outside. In both cases, a fluid-tight connection between test disk and port is obtained by the expansion of the sealing device, by means of which connection the test disk is firmly held in the port. The expansion of the sealing device can be effected, for example, by acting on the sealing device by means of positive pressure, for which purpose a corresponding micropump can be accommodated in the test disk, in particular in the base body.

Particularly preferred is a refinement in which the sealing device is arranged on a radial outer circumference of the base body and is radially outwardly expandable. This constitutes a relatively simple design, in which the test disk can be formed very flat.

In a preferred development, the test disk system has a sealing body with a second radially expandable sealing device, which comprises a recess into which the test disk can be inserted, wherein the test disk can be fixed to the sealing body by expanding the first sealing device. The size and shape of the recess is then preferably matched to the base body in such a way that it can be inserted into the recess flush and with a form fit. By means of the sealing body and/or the shape of the second sealing device, adaptation to the shape of the respective port then takes place, so that a base body can be used with differently shaped ports by means of combination with different sealing bodies. The electronic components and the means required for control can all be contained in the base body, so that the sealing body can be produced relatively economically. If necessary, a pressure-conducting connection is formed between base body and sealing body, in order to be able to transmit the pressure required to expand the second sealing device. However, it is also possible to arrange a dedicated pump in the sealing body.

The second sealing device can in particular be arranged on a radial outer circumference of the sealing body. In this configuration, said sealing device is radially outwardly expandable.

In an alternative refinement, the sealing body has a cylindrical projection, on the inner circumference or outer circumference of which the second sealing device is arranged. As a result, the sealing body can be configured in such a way that the projection overlaps a port from outside. However, it is also possible to configure the sealing body in such a way that the projection can be inserted with the second sealing device into a port which is smaller than the sealing body and/or the base body.

In an alternative refinement, the sealing device is arranged on a sealing adapter, to which the base body is detachably connectable via coupling means. The coupling means are in particular arranged on an underside of the base body and an upper side of the sealing adapter. The base body itself then does not have to have a sealing device. Instead, it is sufficient if the latter is arranged on the sealing adapter. By choosing an appropriate sealing adapter, the base body, which comprises all the electronic components necessary for operation, in combination with the sealing adapter, which together form a test disk, can then be combined with different ports.

Here, it is particularly preferred for the sealing device to be arranged on an outer circumference of the sealing adapter and to be radially outwardly expandable. The sealing adapter can then be formed relatively flat.

In an alternative refinement, the sealing adapter has a cylindrical projection, on the inner circumference or outer circumference of which the sealing device is arranged. By means of appropriate refinement of the projection, the test disk can be used even in the case of smaller ports or ports which are overlapped from outside. The result is therefore great variability.

To expand the sealing device, a means can be arranged in the base body or in the sealing adapter. This means is in particular a pump for applying a positive pressure to the sealing device. The sealing device here is in particular formed like a hose.

Preferably, the base body can be connected to the sealing adapter or the sealing body in such a way that, with a test disk installed in the port, the base body partly adjoins the glove volume. As a result, it is relatively simply possible to pressurize the glove volume by means of the pump arranged in the base body and to measure a pressure profile with the aid of the electronic components arranged in the base body. The coupling means then merely have to ensure a mechanical connection.

Alternatively or additionally, at least one signal-conducting connection and/or at least one pressure-conducting connection can be formed between the base body and the sealing adapter. The base body then does not have to be connected directly to the glove volume. Instead, the connection can be made indirectly via the sealing adapter.

A sealing element is preferably arranged between the base body and the sealing adapter. A seal is therefore made between base body and sealing adapter. This seal then prevents penetration of contaminants between base body and sealing adapter. In addition, a pressure seal can thus be achieved, which is necessary in particular when the base body adjoins the glove volume.

In a preferred refinement, the coupling means are formed as a quick-release fastener, in particular as a bayonet fastener. A fast and secure connection between the base body and different sealing adapters is therefore possible. Thus, adaptation to different ports can be carried out very quickly and simply.

The means for expanding the first and/or second sealing device can be formed in particular as a micro-air pump, wherein, if appropriate, given the presence of an appropriate pressure-conducting connection, both sealing devices can be expanded via the same means. This pump or an additional pump, which is arranged in particular in the base body, can also be used to pressurize the glove volume.

For the automatic setting of a pressure in the glove volume, the electronic components in particular comprise an appropriate control device.

The reading device has in particular an RFID module, CCD sensors or laser sensors.

Via the data interface, the pressure profile and information data from the identification elements can advantageously be transmitted to an evaluation unit of a test system, in particular in a cable-free manner and if appropriate in encrypted form. The data interface can here have a Wi-Fi module, a WLAN module, a Bluetooth module or another radio-based transmitting/receiving module.

The testing system preferably comprises an evaluation unit, which has a memory unit and an output unit and, if appropriate, can be connected to a user database, wherein the pressure profile with the identification data can be assigned to exactly one glove and one port, and an assessment of a condition and/or an estimate of a remaining period of use of the glove can be carried out.

The evaluation unit preferably has a Wi-Fi module, a WLAN module, a Bluetooth module or another radio-based transmitting/receiving module for communication with the data interface of the test disk.

Here, process-related data about the use of the glove, which can be taken into account during the evaluation, can be stored in the evaluation unit.

By using the evaluation unit, when multiple test disks are used for the simultaneous testing of multiple gloves, the test disks can communicate simultaneously with the evaluation unit. Therefore, a time-saving measurement even of many ports and gloves is simultaneously possible.

The glove can generally be inserted in a hermetically tight manner into the port of an isolator, wherein the glove and the port each have an identification element to be read by the reading device of the test system.

The assessment of the seal of a glove with a test disk is carried out by the base body being connected in a pressure-tight manner to the port of an isolator, either directly, in connection with the sealing adapter or with the sealing body. The pressure-tight connection is obtained by expansion of the sealing device or devices. The glove volume then has a positive pressure applied, for example by actuating a pump arranged in the base body. The pressure profile of the glove volume over a predefinable time period is then acquired, wherein information data from the glove and from the port is assigned to the pressure profile. From the pressure profile, a pressure drop is determined and is compared with a limiting value. Depending whether the limiting value is overshot or undershot, the corresponding glove is then reported as defective and must be replaced. During the assessment of the condition of the glove, historic data, in particular process data, can be taken into account, wherein in particular a remaining period of use of the glove is estimated.

Preferably, the pressure profiles from multiple test disks are received and processed simultaneously for a multiplicity of gloves, wherein an unambiguous assignment of the respective pressure profiles to a corresponding glove and port is carried out. If appropriate, removal of the test disk from the port can be prevented if a defect of the glove is ascertained.

Preferably, the pressure profile recorded for a specific glove at an earlier time is compared with a pressure profile recorded for this glove at a later time, wherein this comparison is taken into account to estimate a remaining period of use.

Further features, details and advantages of the invention can be gathered from the wording of the claims and from the following description of exemplary embodiments by using the drawings, in which:

DETAILED DESCRIPTION

Figure 1:
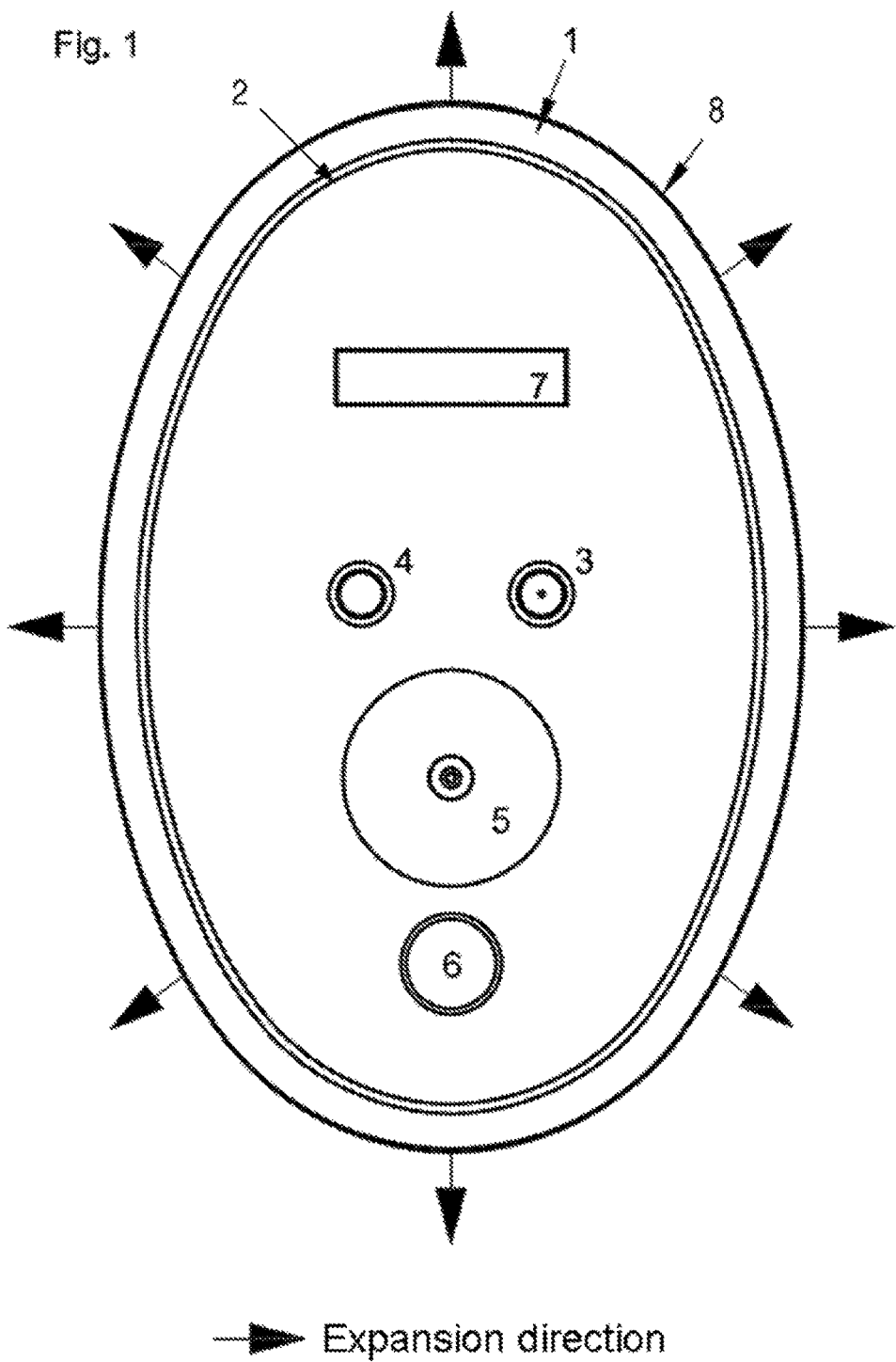
FIG. 1 shows a test disk in plan view.

A test disk 1 is illustrated in FIG. 1. The test disk 1 has a base body 2, on the front side of which there are arranged an on/off switch 3, a start/stop pushbutton 4, a filling valve 5 for filling a glove volume, a pre-filter 6 and an LCD display 7. The test disk 1 has a first sealing device 8, which surrounds the oval base body 2 radially and circumferentially. By inflating the hose-like first sealing device 8, the latter expands outward in a direction which is symbolized by arrows.

FIG. 1 therefore illustrates a test disk 1 which can be inserted into an aperture forming the port and has the effect of sealing from inside to outside. Arranged within the base body of the test disk are electronic components such as a pressure sensor for detecting a pressure in the glove volume, a pressure measuring device having a microprocessor and a pressure sensor for detecting the pressure in the sealing device. Also provided is a valve for filling the sealing device via a first pump. A second pump serves to fill the glove volume. As a reading device for reading identification elements of the glove and of the port, use is made of an RFID module, wherein an interface with a Wi-Fi module is provided for data transmission to an evaluation unit. An energy source serves to supply energy to the individual components.

Figure 2:
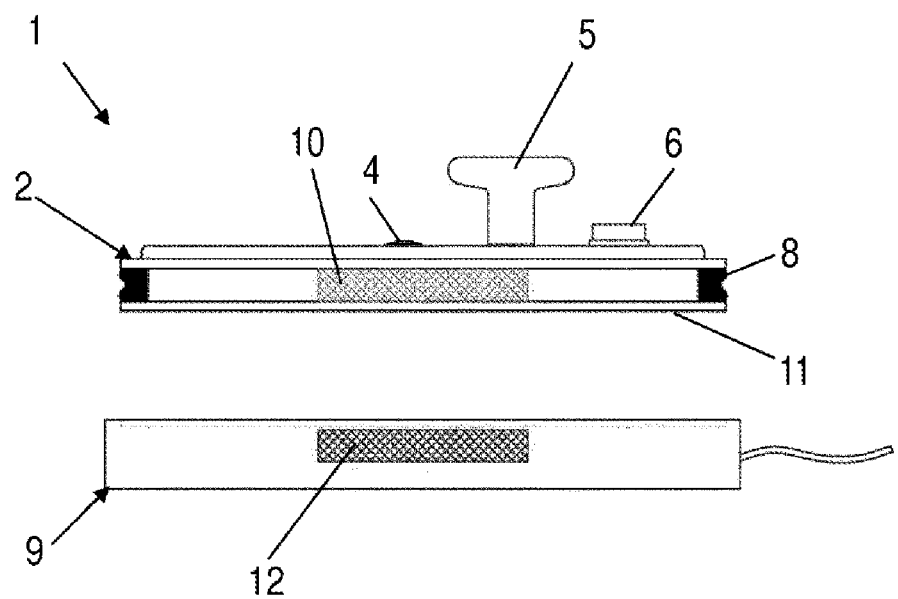
FIG. 2 shows the test disk with inductive charging station in a sectioned side view.

In FIG. 2 the test disk 1 with base body 2 and circumferential first sealing device 8, together with an inductive charging station 9, is illustrated in a sectioned side view. Arranged in the base body 2 is an accumulator 10, being a rear side 11 of the base body 2 is completely closed. The accumulator 10 is therefore arranged in a fully protected manner within the base body 2, which is closed in a fluid-tight manner.

Via the charging station 9, the accumulator 10 can be charged without contact, that is to say without producing a line-bound connection. For this purpose, the test disk must merely be arranged over an appropriate inductive charging device 12 of the charging station 9. In the simplest case, the test disk 1 is simply deposited there. The charging station 9 has a connecting cable, via which electrical energy can be supplied, for example from a public supply network.

Figure 3:
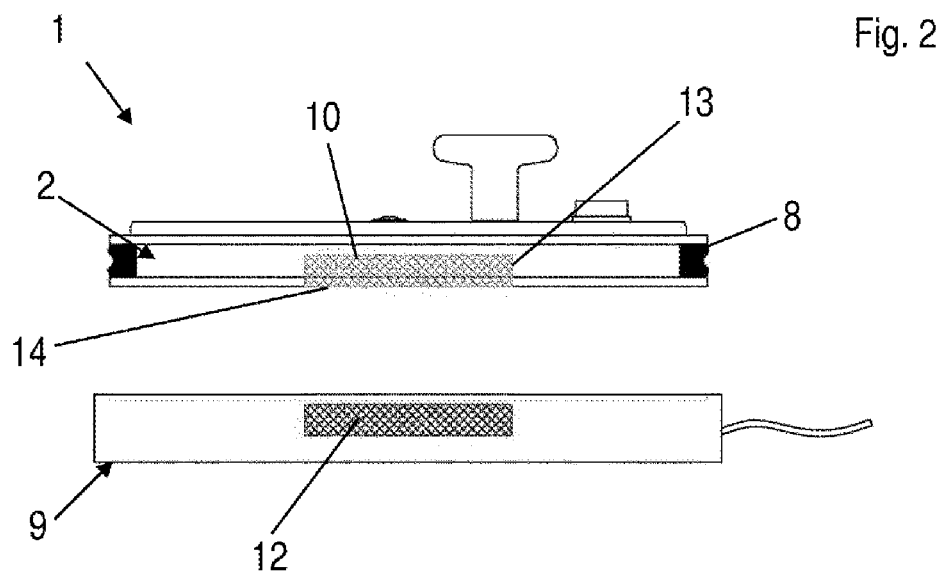
FIG. 3 shows the test disk with inductive charging station in an alternative refinement in a sectioned side view.

FIG. 3 illustrates an alternative refinement of the base body 2, in which the accumulator 10 is accommodated in a compartment 13 in the base body 2 which can be closed in a fluid-tight manner via a cover 14. The cover ends in particular flush with the rear side 11. The charging station 9 is unchanged.

Figure 4:
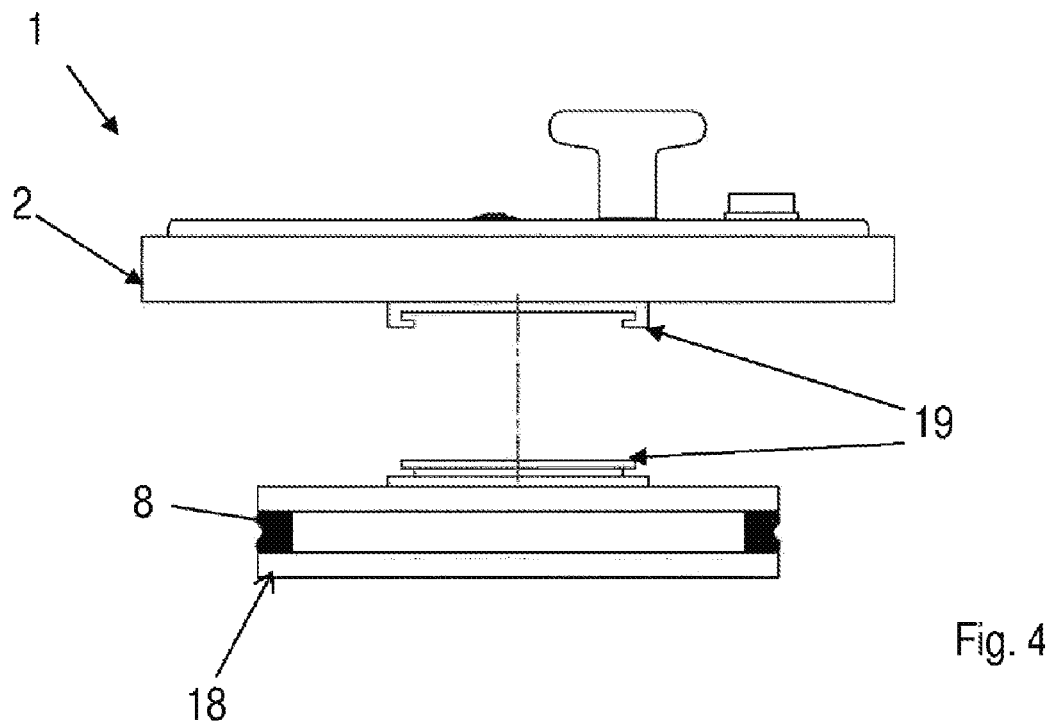
FIG. 4 shows the test disk with base body and a sealing device in a first embodiment.

FIG. 4 shows a test system comprising a base body 2 and a sealing adapter 18, which can be connected to each other via coupling means 19, which are formed as a bayonet fastener. The circumferential, radially expandable sealing device 8 is arranged on the sealing adapter 18. The test disk is therefore formed by the combination of base body 2 and sealing adapter 18. By means of appropriate selection of the sealing adapter, this test system can thus be inserted into different ports using the same base body 2.

Figure 5:
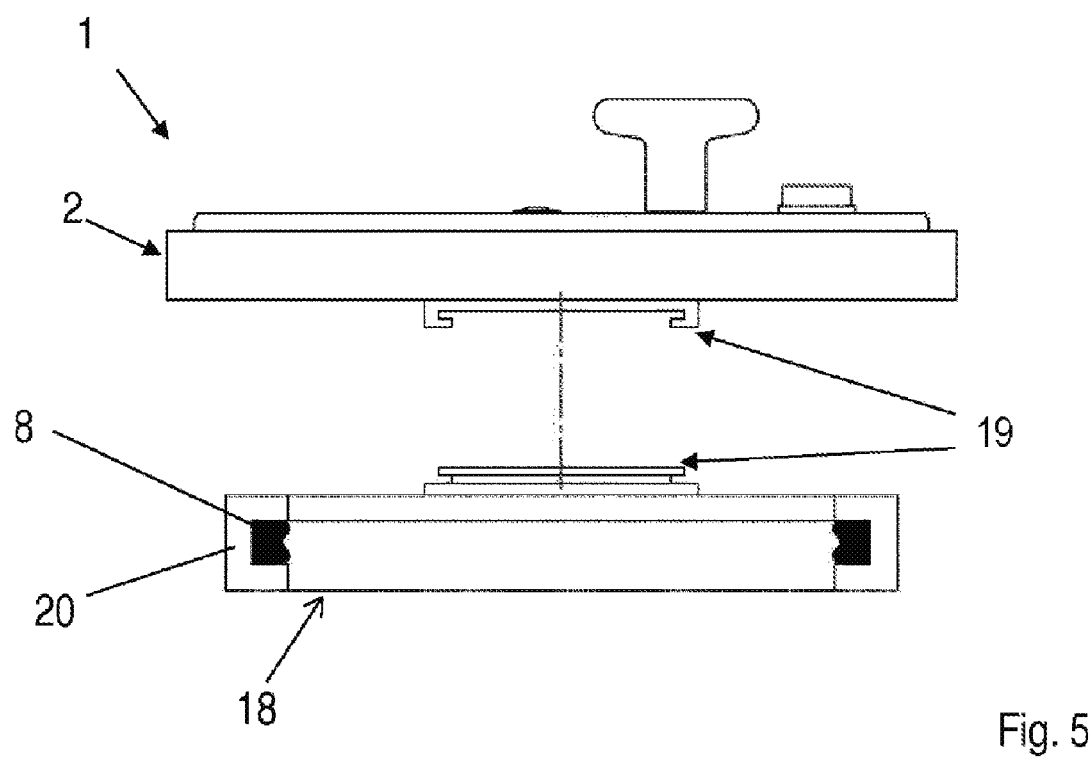
FIG. 5 shows the test disk with base body and a sealing device in a second embodiment.

FIG. 5 shows an alternative refinement of the sealing adapter 18 as compared with FIG. 4. Here, the first sealing device 8 is arranged on an inner side of a cylindrical extension 20 of the sealing adapter 18, so that a port can be overlapped. Following expansion of the sealing device 8, by which means the latter stretches radially inward, sealing from outside to inside takes place. Otherwise, this refinement corresponds to the previous refinement.

Figure 6:
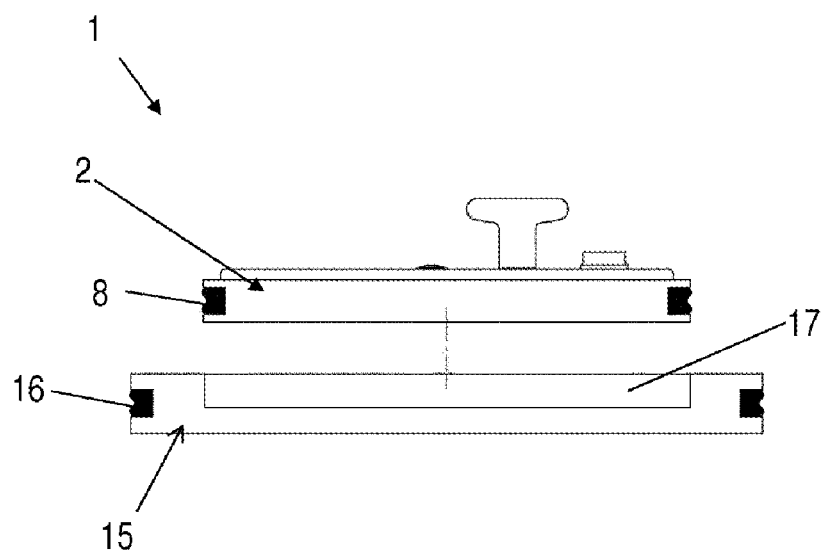
FIG. 6 shows the test disk with base body in a first refinement and a sealing body.

FIG. 6 illustrates a test system comprising a test disk 1 with base body 2 and first sealing device 8 and also a sealing body 15 having a second sealing device 16 in a sectioned side view.

In order to be able to insert the test disk 1 in a fluid-tight manner into ports having another opening, the replaceable sealing body 15 is provided. For this purpose, the base body 2 is inserted, in particular flush, into a corresponding recess 17 of the selected sealing body 15. By expanding the first sealing device 8, secure fixing of the base body with the electronic components within the sealing body 15 is then carried out. These can then be inserted together into a corresponding port, whereupon the second sealing device 16 is expanded, so that the test disk is held reliably and in a fluid-tight manner in the port.

The recess 17 in this refinement is formed with a bottom. Accordingly, an application of pressure to the glove volume is carried out through corresponding pressure lines formed in the sealing body or through openings, not shown, in the bottom of the recess 17.

Figure 7:
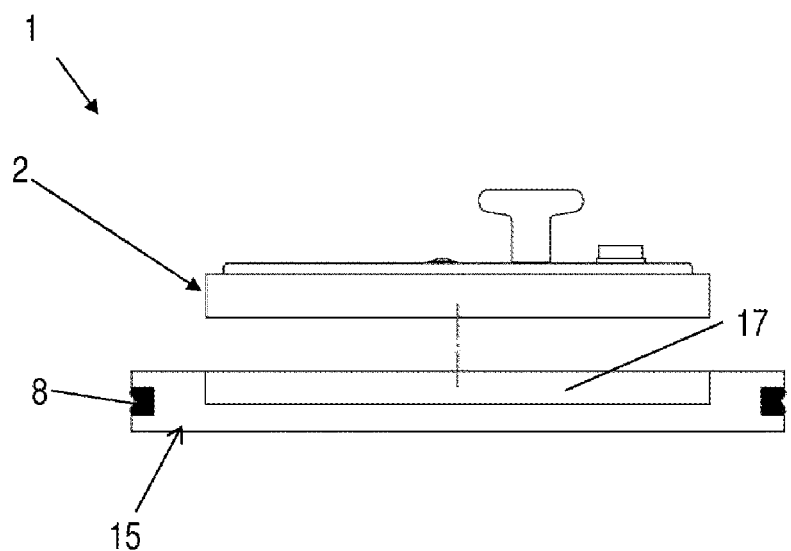
FIG. 7 shows the test disk with base body in a second refinement and a sealing body.

FIG. 7 shows an alternative refinement in which, differing from the refinement according to FIG. 6, the base body is not provided with a circumferential sealing device. As a result, the base body itself cannot be used as a test disk but only in connection with a corresponding sealing body. If necessary, sealing of the base body in the recess can be carried out via appropriate sealing elements, so that the underside of the base body can enter into pressure-conducting contact with the glove volume without it being necessary to fear any pressure loss.

The invention is not restricted to one of the above-described embodiments but can be modified in multifarious ways.

Thus, in particular, the arrangement of the sealing device in the example in FIGS. 1 to 3 and 6 and 7 can also be configured in a manner analogous to the refinement according to FIG. 5, so that an overlapping of the ports and sealing from the outside to inside is carried out. In addition, if necessary, an additional pump can be arranged in the sealing adapter or in the sealing body in order to expand the respective pressure device and/or to pressurize the glove volume. However, it is also conceivable to use a pump arranged in the base body for this purpose.

All the features and advantages emerging from the claims, the description and the drawing, including constructional details, physical arrangements and method steps, can contribute to the invention, both on their own and in the widest possible range of combinations.

LIST OF DESIGNATIONS

1 Test disk
2 Base body
3 On/off switch
4 Start/stop pushbutton
5 Filling valve
6 Pre-filter
7 LCD display
8 First sealing device
9 Charging station
10 Accumulator
11 Rear side
12 Charging device
13 Compartment
14 Cover
15 Sealing body
16 Sealing device
17 Recess
18 Sealing adapter
19 Coupling means
20 Projection

The invention claimed is:

1. A test disk system having at least one test disk for testing the seal of a glove which is installed in a port of an isolator, wherein the test disk is connectable in a hermetically sealed fashion to the port, wherein the glove encloses with the test disk a glove volume which can be pressurized by the test disk, wherein the test disk has a base body in which electronic components for recording and storing a pressure profile in the glove volume and at least one data interface are arranged, wherein the test disk has a reading device for reading both a first identification element which is arranged on the glove and also a second identification element which is assigned to the port, and wherein the test disk has a first radially expandable sealing device which is arranged on the base body, and further including a sealing body with a second radially expandable sealing device, wherein the sealing body comprises a recess into which the base body can be inserted, wherein the base body can be fixed to the sealing body by expanding the first radially expandable sealing device, which is arranged on the base body.

2. The test disk system as claimed in claim 1, wherein an accumulator is arranged in the base body as an electrical power store, which can be charged inductively.

3. The test disk system as claimed in claim 2, wherein the accumulator is arranged in a compartment which can be closed in a fluid-tight manner via a cover which is arranged on a rear side of the base body.

4. The test disk system as claimed in claim 2, wherein the accumulator is accommodated within the base body, which is designed to be closed in a fluid-tight manner.

5. The test disk system as claimed in claim 2, further including an inductive charging station, on which the test disk can be deposited, wherein the accumulator of the test disk can be charged inductively.

6. The test disk system as claimed in claim 1, wherein the first radially expandable sealing device is arranged on a radial outer circumference of the base body and is radially outwardly expandable.

7. The test disk system as claimed in claim 1, wherein the second radially expandable sealing device is arranged on a radial outer circumference of the sealing body and is radially outwardly expandable.

8. The test disk system as claimed in claim 1, wherein the sealing body has a cylindrical projection, on the inner circumference or outer circumference of which the second radially expandable sealing device is arranged.

9. The test disk system as claimed in 1, wherein a means for expanding the first radially expandable sealing device is arranged in the base body.

10. The test disk system as claimed in claim 1, wherein the base body partly adjoins the glove volume.

11. The test disk system as claimed in 1, wherein at least one signal-conducting connection and/or at least one pressure-conducting connection is formed between the base body and the sealing body.

12. The test disk system as claimed in 1, wherein a sealing element is arranged between the base body and the sealing body.

13. The test disk system as claimed in claim 1, wherein a pump is arranged in the base body in order to pressurize the glove volume.

* * * * *